United States Patent [19]

Cohen et al.

[11] Patent Number: 4,555,319

[45] Date of Patent: Nov. 26, 1985

[54] RADIATION-CURABLE COMPOSITIONS COMPRISING ISOCYANURIC ACID-ACROLEIN DERIVATIVES

[75] Inventors: Saul M. Cohen, Springfield; John R. LeBlanc, Wilbraham, both of Mass.

[73] Assignee: Monsanto Company, St. Louis, Mo.

[21] Appl. No.: 332,641

[22] Filed: Dec. 21, 1981

[51] Int. Cl.$^4$ ............... C08F 2/50; C08F 2/54; C08G 2/26; C08G 2/02

[52] U.S. Cl. ............... 204/159.21; 204/159.22; 204/159.23; 528/245

[58] Field of Search ............... 204/159.21, 159.22, 204/159.23

[56] References Cited

U.S. PATENT DOCUMENTS

| | | | |
|---|---|---|---|
| 4,194,955 | 3/1980 | Nowak et al. | 204/159.21 |
| 4,284,710 | 8/1981 | Burg | 204/159.22 |
| 4,293,693 | 10/1981 | Cohen et al. | 544/221 |
| 4,321,375 | 3/1982 | Cohen et al. | 544/221 |
| 4,326,057 | 4/1982 | Cohen et al. | 544/221 |
| 4,328,325 | 5/1982 | Marquardt et al. | 204/159.23 |
| 4,333,963 | 6/1982 | Emmons et al. | 204/159.23 |

OTHER PUBLICATIONS

Kosar "Light–Sensitive Systems" 1965, Wiley & Sons, pp. 170–171.

*Primary Examiner*—John C. Bleutge
*Assistant Examiner*—A. H. Koeckert
*Attorney, Agent, or Firm*—R. Bruce Blance; William J. Farrington

[57] ABSTRACT

Radiation-curable compositions comprising an ester of an ethylenically unsaturated acid and a polyhydric alcohol and an oxopropyl isocyanurate formed by the addition of from 2 to 3 moles of acrolein to 1 mole of isocyanuric acid. The compositions are useful as coatings, printing inks, adhesives and the like.

6 Claims, No Drawings

RADIATION-CURABLE COMPOSITIONS COMPRISING ISOCYANURIC ACID-ACROLEIN DERIVATIVES

BACKGROUND OF THE INVENTION

This invention relates to radiation-curable compositions containing polyunsaturated compounds and isocyanuric acid-acrolein derivatives and to a process of curing such compositions.

Polyunsaturated compounds containing activated unsaturated groups such as acrylic groups, polymerize readily when they are exposed to ultraviolet or ionizing radiation. However such compounds are inhibited from polymerizing by air and cure is generally achieved under a nitrogen atmosphere or by using excessive amounts of radiation or activator. We have found that the addition of polyaldehyde adducts of isocyanuric acid and acrolein or the hemiacetals of the polyaldehyde adducts, allows cure to be accomplished more readily in the presence of air.

One aspect of our invention is directed to a radiation-curable coating composition comprising about 50 to about 90 parts by weight of an ester of an ethylenically unsaturated acid and a polyhydric alcohol, and about 10 to about 50 parts by weight of a polyaldehyde adduct formed from 1 mole of isocyanuric acid and from about 2 to about 3 moles of acrolein or a hemiacetal of the polyaldehyde adduct. Another aspect of the invention is directed to a process of curing the composition by exposing it to an effective amount of polymerization-initiating radiation.

The polyunsaturated compounds of the compositions of the present invention are esters of an ethylenically unsaturated acid and a polyhydric alcohol. Advantageously the ethylenically unsaturated acid is selected from the group consisting of acrylic acid, methacrylic acid and itaconic acid and is preferably acrylic acid. Advantageously the polyhydric alcohol has a number average molecular weight of less than about 1000. Such polhydric alcohols include hydrocarbyl polyols, ether polyols, ester polyols, amide polyols, urethane polyols, and cyclic nitrogen-containing polyols.

The hydrocarbyl polyols include ethylene glycol, 1,2-propanediol; 1,3-propanediol; 1,2-butanediol; 1,3-butanediol; 1,4-butanediol; 2,3-butanediol; 1,6-hexanediol; 2,4-pentanediol; 1,5-pentanediol; 2,5-hexanediol; 2-methyl-1,3-pentanediol; 2-methyl-2,4- pentanediol; 2,4-heptanediol; 2-ethyl-1,3-hexanediol; 2,2-dimethyl-1,3-propanediol; 1,2-cyclohexanediol; 1,4-cyclohexanediol; 1,4-bis(hydroxymethyl)cyclohexane; 2,2-diethylpropanediol-1,3; 2,2-diethylbutanediol-1,3; butene-2-diol-1,4; trimethylolpropane; trimethylolethane; glycerol; 1,2,4-butanetriol; 1,2,6-hexanetriol; erythritol, D-threitol; L-threitol; sorbitol and D-mannitol.

The ether polyols include polyalkylene glycols such as diethylene glycol, triethylene glycol, dipropylene glycol, diglycerol, poly(tetramethylene ether)glycols, 2,2-bis(hydroxyethoxyphenyl)propane, 2,2-bis(hydroxypropoxyphenyl)propane, polyols formed by hydrolysis of the glycidyl groups of epoxy resins, and ether polyols formed by addition of alkylene oxide, such as ethylene oxide and propylene oxide to any of the above-described hydrocarbyl polyols.

The ester polyols include esterification products obtained by esterification of any of the above-described hydrocarbyl polyols and other polyols with polycarboxylic acids such as phthalic, isophthalic, terephthalic, trimellitic, pyromellitic, tetrahydrophthalic, hexahydrophthalic, adipic, azelaic, sebacic, malic glutaric, chlorendic, tetrachlorophthalic, maleic, fumaric, itaconic, malonic, pimelic, suberic, 2-methylsuccinic, 2,3-dimethylsuccinic, 3,3-diethylglutaric, 3,3-dimethylglutaric, 2,2-dimethylglutaric, 2,2-dimethylsuccinic and the like. Anhydrides of these acids, where they exist, can also be employed and are encompassed by the term "dicarboxylic acid". Finally, certain materials which react in a manner similar to acids to form polyester polyols are also useful. Such materials include lactones such as caprolactone, propiolactone, and methyl caprolactone, and hydroxy acids such as tartaric acid. If a triol or higher alcohol is used, some monocarboxylic acid, such as acetic acid, may be used with the polycarboxylic acid to form the polyester polyol oligomer, and for some purposes, such a composition would be highly desirable.

The amide polyol oligomers useful in the instant invention are produced from any of the above-described polyacids or lactones and diols, triols and higher alcohols, and small amounts of diamines or aminoalcohols. Suitable diamines and aminoalcohols include hexamethylene diamine, ethylene diamine, monoethanolamine, phenylenediamines, toluenediamines, diethanolamines and the like.

The polyurethane polyol oligomers useful in the instant invention are produced by reacting any of the above-described polyols, including diols, triols and higher alcohols, ether-containing polyols, polyester polyol oligomers and polyester ether polyol oligomers as herein before described with an organic polyisocyanate.

The polyisocyanate which is reacted with the polyol can be essentially any organic polyisocyanate, e.g., hydrocarbon polyisocyanates or substituted hydrocarbon polyisocyanates. Many such organic polyisocyanates are known in the art, including p-phenylene diisocyanate, biphenyl diisocyanate, toluene diisocyanate, 3,3'-dimethyl-4,4'-diphenylene diisocyanate, 1,4-tetramethylene diisocyanate, hexamethylene diisocyanate, 2,2,4-trimethylhexane-1,6-diisocyanate, methylene-bis(phenylisocyanate), lysine methyl ester diisocyanate and methylcyclohexyl diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis(isocyanatocyclohexyl)methane, 1,4-butylene diisocyanate, methylcyclohexyl diisocyanate, and isophorone diisocyanate.

The conditions of the reaction between the polyol and the polyisocyanate are chosen so as to produce an hydroxyl-containing urethane reaction product of low molecular weight, i.e., a polyurethane polyol oligomer. In general, this is accomplished by utilizing an equivalent ratio of isocyanate groups to hydroxyl groups of less than about one, and allowing substantially all the isocyanate groups present to react.

Suitable cyclic nitrogen-containing polyols include such compounds as tris(hydroxyethyl)isocyanurate (THEIC); N,N'-bis(hydroxyethyl)dimethyl hydantoin (BHDH); 1,4-bis [4,4-bis(hydroxymethyl)-1,3-oxazol-2-ene-2-yl]butane; hydroxylated THEIC; hydroxyalkylated BHDH; bis(hydroxyethyl)ethylene urea; 4,4-bis(-hydroxymethyl)-1,3-oxazolidin-2-one; hexamethylolmelamine and hexamethylolmelamine partly etherified with a $C_1$ to $C_6$ monohydric alchol and hexamethylolmelamine etherified with a $C_1$ to $C_6$ monohydric alcohol and a dihydric alcohol such as ethylene glycol or propylene glycol.

The cyclic nitrogen-containing polyols may be used by themselves or they may be reacted with any of the above-described acids to form ester groups or with any of the above-described polyisocyanates to form urethane groups.

The polyunsaturated compounds are prepared by conventional means by interaction of the ethylenically unsaturated acid, or its anhydride, or acid halide or ester with the polyhydric alcohol of derivative thereof or by interaction of a hydroxyester such as a 2-hydroxyethyl ester of the ethylenically unsaturated acid with a polyisocyanate, a polyacid or an alkoxymethylmelamine. On average at least about two ethylenically unsaturated acid moieties are attached to the polyhydric alcohol moiety.

The polyaldehyde adducts of isocyanuric acid and acrolein are obtained by adding on average at least about 2 moles of acrolein to one mole of isocyanuric acid. Such adducts, and their method of preparation are described in copending application Ser. No. 219,209, filed Dec. 22, 1980 now U.S. Pat. No. 4,326,057. They comprise monomeric bis(3-oxopropyl)isocyanurate and tris(3-oxopropyl)isocyanurate and oligomers thereof. They may be conveniently used as such or in the form of their hemiacetals prepared by interaction with monohydric alcohols, preferably the lower boiling $C_1$ to $C_8$ alcohols, as described in the above cited copending application which is incorporated herein in full.

The weight ratio of polyunsaturated compound to adduct of isocyanuric acid and acrolein or hemiacetal thereof is advantageously in the range of about 1:1 to about 9:1 and is preferably in the range of 7:3 to about 8.5:1.

The compositions of the present invention can advantageously include vinyl monomers, the preferred vinyl monomers being styrene, acrylonitrile, vinyl pyrrolidone, acrylic acid, methacrylic acid and esters of $C_1$–$C_8$ monohydric alcohols and acrylic or methacrylic acid such as methyl acrylate, butyl acrylate, butyl methacrylate, octyl acrylate and 2-ethylhexyl methacrylate. The amount of such monomer is preferably in the range of 10 to about 100 parts by weight per 100 parts by weight of polyunsaturated compound and polyaldehyde derivative of isocyanuric acid and acrolein.

While the novel compositions of this invention may photopolymerize at satisfactory rates in the absence of photinitiating additives, their photocuring rates can be increased by the addition thereto of a photoinitiator. Examples of suitable photoinitiators include the following: acyloin or an acyloin derivative, such as benzoin, benzoin methyl ether, benzoin ethyl ether, desyl bromide, desyl chloride, desyl amine, and the like: and halogenated aliphatic, alicyclic and aromatic hydrocarbons and their mixtures in which the halogen atoms are attached to the carbon chain in the aliphatic compounds and are attached directly to the ring structure in the aromatic and alicyclic compounds, that is, the halogen is bonded directly to the aromatic or alicyclic hydrocarbon nucleus. The halogen may be chlorine, bromine, fluorine, or iodine. Examples of such photoinitiators include polychlorinated polyphenyl resins, such as the Aroclors (Monsanto Company) which in general are polychlorinated diphenyls, polychlorinated triphenyls, and mixtures of polychlorinated diphenyls and polychlorinated triphenyls; polyfluorinated phenyls (E.I. DuPont de Nemours & Co.,); chlorinated rubbers, such as the Parlons (Hercules Powder Company); copolymers of vinyl chloride and vinyl isobutyl ether, such as Vinoflex MP-400 (BASF-Wyandotte Inc.); chlorinated aliphatic waxes, such as Chlorowax 70 (Diamond Alkali, Inc.,); perchloropentacyclodecane, such as Dechlorane-(Hooker Chemical Co.); chlorinated paraffins, such as Clorafin 40 (Hooker Chemical Co.) and Unichlor-70B (Neville Chemical Co.); mono- and polychloro- benzenes; mono- and polybromobenzenes; mono- and polychloroxylenes; mono- and polybromoxylenes; dichloromaleic anhydride; 1-(chloromethyl) naphthalene; 2,4-dimethylbenzene sulfonyl chloride; 1-bromo-3-(m-phenoxyphenoxy benzene); 2-bromoethyl methyl ether; chlorendic anhydride; and the like; and mixtures thereof.

These sensitizers or photoinitiators are used in amounts ranging from about 0.1 to about 50 per cent, and preferably from about 2 to about 25 percent, of the weight of the total composition.

Irradiation of the coating compositions of the invention can be accomplished by any one or a combination of a variety of methods. The compounds may be exposed for example, to actinic light from any source and of any type as long as it furnishes an effective amount of ultraviolet radiation, since the compounds of this invention activatable by actinic light generally exhibit their maximum sensitivity in the range of about 1,800A. to 4,000A., and preferably about 2,000A. to 3,000A.; electron beams; gamma radiation emitters, and the like; and combinations of these. Suitable sources include carbon arcs, mercury-vapor arcs, fluorescent lamps with special ultraviolet-light emitting phosphors, argon glow lamps, photographic flood lamps, Van der Graaff accelerators, resonant transformers, Betatrons, linear accelerators, and so forth.

The time of irradiation is not critical but must be sufficient to give the effective dosage. Irradiation may be carried out at any convenient temperature, and most suitably at room temperature for economic reasons. Distances of the radiation source from the work may range from about one-eighth inch to 10 inches, and preferably from about one-eighth inch to 5 inches.

The compounds of the present invention are suitable for use in the absence of solvents and in the presence of oxygen as vehicles for paints, lacquers and printing inks which are capable of setting or hardening after printing by exposure to radiation. They are suitable also as compositions and elements for the preparation of photographic images, printing plates, and rolls; as adhesives for foils, films, papers, fabrics, and the like; and as coatings for metals, plastics, paper, wood, foils, textiles, glass, cardboard, box board, and the like.

When the photopolymerizable compounds of the present invention are used as adhesives with lamina, at least one of the lamina must be translucent when ultraviolet light is used. When the radiation source is an electron beam or gamma radiation, at least one of the lamina must be capable of transmitting high energy electrons or gamma radiation, respectively, and neither is necessarily translucent to light. Typical laminations include polymer-coated cellophane to polymer-coated cellophane films, polymer-coated cellophane to polypropylene, Mylar to a metal substrate such as aluminum or copper, polypropylene to aluminum, and the like.

Various dyestuffs, pigments, plasticizers, lubricants, stabilizers, flow control agents, levelling agents and other modifiers may be incorporated in the coating compositions to obtain certain desired charateristics in the finished products. The coatings may be applied by any conventional technique such as spraying, roll coating, dip coating, flow coating etc., to an average depth in the range of about 0.1 to 4 mils.

The following examples are set forth in illustration of the invention and should not be construed as limitations thereof. Parts and percentages are by weight unless otherwise indicated.

EXAMPLE 1

A solid polyaldehyde adduct was obtained by the addition of three moles of acrolein to one mole of isocyanuric acid under mildly acid conditions. The polyaldehyde had an equivalent weight of 99 and contained one aldehyde group per equivalent when it was analyzed by the conventional hydroxylamine method. It was comprised subtantially of tris(3-oxopropyl)isocyanurate. The solid (25.6 parts by weight) was fused to a viscous liquid at 100° C. and was mixed with ethylene glycol monomethyl ether (6.6 parts) to form the hemiacetal, a liquid at room temperature. 47.5 parts of 1,6-hexanediol diacrylate and 17.5 parts of the reaction product of 1 mole bisphenol A diglycidyl ether and 2 moles acrylic acid were mixed with the hemiacetal, followed by 0.9 parts of a commercial flow control agent sold by the 3M Company under the tradename FC-430, and 2.0 parts of benzoin ethyl ether. The coating composition was stored in the dark. The coating composition was applied to primed steel test panels by means of a draw-down blade to give coating of about 13 microns in thickness. The coated panels were run through a UV Processor Model Number QC1202AN supplied by Radiation Polymer Co., Plainsfield, Ill., equipped with two 1200-watt mercury vapor lamps at a height of four inches above the panels. The belt speed of the UV Processor was 30 feet per minute (9.15 m per minute). The cured coatings were clear and glossy, and possessed a pencil hardness of 2H and a forward immpact strength of 28 in-lb. (3.16J). The coatings had good solvent and humidity resistance.

EXAMPLE 2

Example 1 was repeated without the tris(3-oxopropyl)isocyanurate composition. The coating composition containing 71 parts by weight 1,6-hexanediol diacrylate. 26 parts by weight of the reaction product of 1 mole of bisphenol A diglycidyl ether and 2 moles acrylic acid, 0.6 parts by weight of flow-control agent FC-430 and 2.0 parts by weight of benzoin ethyl ether was exposed to UV radiation under the same conditions as set forth in example 1. The coating composition remained uncured.

EXAMPLE 3

18.7 parts by weight of the tris(3-oxopropyl)isocyanurate composition of example 1 was fused at 100° C. and mixed with 14.0 parts by weight of acrylic acid. The mixture was cooled to room temperature and 46.7 parts of the reaction product of 1 mole of bisphenol A diglycidyl ether and 2 moles acrylic acid, 18.7 parts of butyl acrylate and 1.9 parts of benzoin ethyl ether were added and mixed thoroughly to provide a coating composition. The coating composition was stored in the dark. Coatings of 50 microns dry thickness were applied to test panels. They were exposed to UV radiation under the conditions set forth in example 1. The coatings developed a pencil hardness of 2H, good solvent resistance and a forward impact strength of 50 in-lb. (5.65J).

EXAMPLE 4

In this example trimethylolpropane triacrylate was substituted for the tris(3-oxopropyl)isocyanurate composition in the coating composition of example 3. The coating composition contained 13.4 parts by weight of acrylic acid, 22.3 parts by weight of trimethylolpropane triacrylate, 44.6 parts of the reaction product of 1 mole of bisphenol A diglycidyl ether and 2 moles of acrylic acid, 17.9 parts of butyl acrylate and 1.8 parts of benzoin ethyl ether. The coating compositions were applied to test panels and exposed to UV radiation in the fashion of example 3. Coatings of 30 microns, possessing a pencil hardness of F, good solvent resistance and a forward impact strength of 15 in-lbs. (1.70 J), were obtained.

EXAMPLE 5

A coating composition was prepared by the method of example 1 with 25.6 parts by weight of the tris(3-oxopropyl)isocyanurate composition, 6.6 parts of ethylene glycol monomethyl ether, 47.5 parts tetraethylene glycol diacrylate, 17.5 parts of the reaction product of 1 mole bisphenol A diglycidyl ether and 2 moles acrylic acid, 0.9 parts of flow control agent FC-430 and 2 parts of benzoin ethyl ether. The coating composition was applied to test panels to provide coatings of 30 microns dry thickness. The coatings were cured by the exposure to UV radiation under the conditions set forth in Example 1. The cured coatings possessed a pencil hardness of 2H, good solvent resistance and a forward impact strength of 80 in-lbs. (9.04 J).

EXAMPLE 6

A composition was prepared by the method of Example 1 with 19.1 parts by weight of the tris(3-oxopropyl)isocyanurate composition, 14.3 parts of acrylic acid, 47.6 parts of the reaction product of 1 mole bisphenol A diglycidyl ether and 2 moles acrylic acid and 19.1 parts of butyl acrylate. The composition was exposed to an electron beam dosage of 5.0 megarads and a solid product which was insoluble in methyl ethyl ketone was obtained.

What is claimed is:

1. A radiation-curable coating composition comprising about 50 to about 90 parts by weight of a polyunsaturated ester of an ethylenically unsaturated acid and a polyhydric alcohol, and about 10 to about 50 parts by weight of a polyaldehyde adduct formed from 1 mole of isocyanuric acid and from about 2 to about 3 moles of acrolein or a hemiacetal of the polyaldehyde adduct.

2. The composition of claim 1 comprising from about 0.1 to about 50 percent by weight of a sensitizer selected from the group consisting of acyloin, acyloin derivatives and halogenated hydrocarbons, wherein the ethylenically unsaturated acid is selected from the group consisting of acrylic acid, methacrylic acid and itaconic acid.

3. The composition of claim 1 or 2 wherein the ethylenically unsaturated acid is selected from the group consisting of acrylic acid, methacrylic acid and itaconic acid.

4. The composition of claim 3 wherein the polyhydric alcohol has a number average molecular weight of 1000 or less.

5. A process of drying the composition of claim 1 which comprises exposing the composition to radiation.

6. A process of drying the composition of claim 2 which comprises exposing the composition to actinic radiation.